Figure 1:
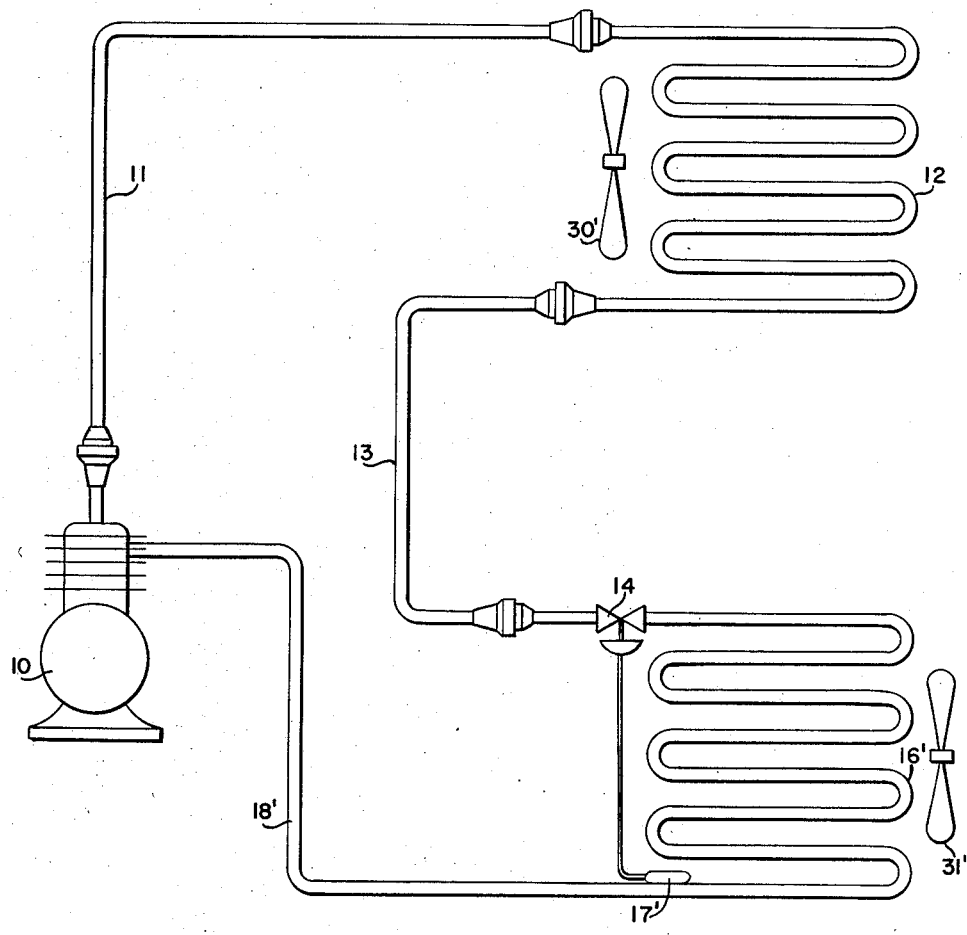

Sept. 8, 1959                K. M. GERTEIS                2,903,004
                              COUPLING DEVICES Filed Nov. 1, 1955                                      2 Sheets-Sheet 1

INVENTOR.
KARL M. GERTEIS.

BY

ATTORNEY.

Sept. 8, 1959    K. M. GERTEIS    2,903,004
COUPLING DEVICES

Filed Nov. 1, 1955    2 Sheets-Sheet 2

INVENTOR.
KARL M. GERTEIS.
BY
ATTORNEY.

United States Patent Office 2,903,004
Patented Sept. 8, 1959

2,903,004

COUPLING DEVICES

Karl M. Gerteis, Syracuse, N.Y., assignor to Carrier Corporation, Syracuse, N.Y., a corporation of Delaware Application November 1, 1955, Serial No. 544,166

6 Claims. (Cl. 137—74)

This invention relates generally to coupling devices. More particularly, the invention pertains to coupling devices for connecting sealed components of a system together in a manner, such that loss or contamination of the contents of the components is prevented as the connection is made.

A variety of situations exist wherein it is necessary to connect two or more closed systems or to connect two or more sealed components of a closed system. Thus, in many plumbing situations it may be necessary to join one hot water, or steam system to another, without releasing the fluids of said systems to the atmosphere.

In the refrigeration field, for illustration, it has been found that refrigeration system assembly problems in the field are substantially reduced if many of the elements forming the refrigeration system can be connected in sub-assemblies in the factory and the sub-assemblies be permanently connected at the field installation. Thus, the number of connections to be made in the field are maintained at a predetermined minimum. Accordingly the principal use of the coupling device forming the subject of this invention is under circumstances wherein field connections of refrigeration system sub-assemblies are involved.

This invention contemplates a coupling device utilizing a fusible sealing element adapted for assembly in the free end of a component or sub-assembly that will eventually be joined to a like component or sub-assembly so as to form a unitary closed system. Heretofore it has been proposed that coupling members utilizing frangible diaphragms be employed to connect refrigeration system sub-assemblies with one another to form a unitary system. After two or more of the sealed sub-assemblies have been connected by a suitable coupling member the frangible diaphragms are ruptured through the use of an element equipped with means for rupturing the diaphragms. This type of coupling device has proven to be expensive and also does not include any arrangement for the disposal of the material forming the frangible diaphragm.

This invention proposes a coupling device wherein a novel fusible element is employed to seal one end of a component or sub-assembly that will eventually be joined to another component or sub-assembly having a like fusible element assembled therein. The novel fusible element employed herein includes a retaining means adapted to accommodate the material forming the fusible sealing element or plug when heat sufficient to melt the fusible plug is applied to a coupling connecting two components having the fusible sealing elements therein.

The chief object of this invention involves the provision of an approved coupling unit for uniting or connecting sealed components of a system to form a unitary device without the loss or substantial contamination of the contents of the components.

A further object of this invention involves the provision of a coupling unit including a fusible sealing element equipped with means for accommodating the material from which the seal is formed after heat, sufficient to melt the fusible member, has been applied to a connection embodying the improved coupling.

A still further object of the invention is the provision of an improved coupling unit of the kind described, wherein the material accommodating means supports the material in a manner to prevent substantial restriction to flow through the passage formed by the components being connected.

In achieving the above mentioned objects it is contemplated that when connecting components of a system, that each component be equipped in the factory with a closure member in the form of a connector or fitting having a passage therethrough in axial alignment with a passage in the component, and further that the closure member be provided with a fusible sealing element at one end thereof. The other or open end of the connector is adapted to be assembled over the open end of the component in fluid tight relation. In addition to the fusible element located in the end of the connector, a retaining member, preferably in the form of a grid is assembled behind the fusible plug within the confines of the connector. The purpose of the retaining member is to accommodate the material forming the fusible sealing element when heat, sufficient to melt the element is applied to a connection including two connectors of the type described above.

Figure 2:
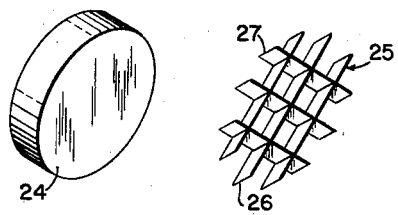
Figure 3:
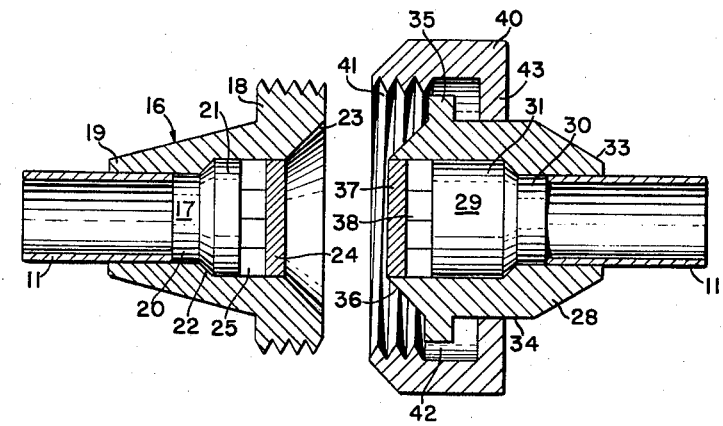

Other objects and features of the invention will be apparent upon a consideration of the specification and drawings in which:

Figure 1 is a diagrammatic view of a refrigeration system equipped with a coupling device of the type herein contemplated;

Figure 2 is a perspective exploded view of a fusible sealing plug and a preferred form of a retaining means illustrating the invention wherein the thickness of the plug has been exaggerated in the interest of clarity; and Figure 3 is a cross-sectional view through a connection prior to the assembly thereof, showing a pair of system components, equipped with connectors or fittings equipped with the novel fusible sealing element, the thickness of which has been exaggerated in the interest of clarity and also showing the coupling collar contemplated by this invention.

Referring more particularly to the drawings, Figure 1 illustrates a refrigeration system including a compressor 10, discharge line 11, and a condenser 12 arranged in the conventional manner wherein refrigerant in the gaseous phase is transmitted to the condenser from the compressor through the discharge line 11. The gaseous refrigerant is converted to the liquid phase in the condenser as air under the influence of fan 30' is placed in heat exchange relation with the refrigerant in the condenser. The liquid refrigerant flows to the evaporator 16' through liquid line 13 and thermal expansion valve 14. The thermal expansion valve 14 is regulated by the bulb 17' sensing the temperature of evaporator 16' in the customary manner. To complete the refrigeration cycle suction line 18' permits communication between the evaporator 16 and the compressor 10. The liquid refrigerant is converted to the gaseous phase in the evaporator as air, under the influence of fan 31', flows in heat exchange relation with the refrigerant in the evaporator coil. It will be appreciated that the refrigerant cycle described may be used in an air conditioning system of the type having the components remotely spaced relative to one another.

It is proposed that four coupling devices of the type contemplated by this invention be applied to the refrigeration system components in the manner shown in Figure 1. By using the coupling device in the manner suggested sub-assemblies of the refrigeration system may be formed in the factory and the sub-assemblies connected in the field to form the complete refrigeration system.

Referring more particularly to Figures 2 and 3 for an illustration of the coupling means forming the invention it will be noted that a first connector or fitting 16 having an axial passageway or opening 17 extending therethrough is asssembled on the end of a portion of the tubing forming a section of the discharge line 11. Connector 16 includes an enlarged end portion 18 having threads about the external surface thereof and a conical skirt portion 19. Referring more particularly to the differential opening 17 it will be noted that the first portion 20 of the opening has a diameter substantially the same as the outside diameter of the tubing 11. An intermediate portion 21 having a diameter greater than portion 20 extends axially from a conical shoulder 22. Further, opening 17 includes an end portion formed as a substantially conical seat 23 for a purpose to be later described. At the foremost part of portion 21 of the opening 17 a circular plug member 24, forming, in effect, a closure for the section of tubing 11, is positioned. The plug member fits tightly within the opening 17 and is formed of an alloy having a relatively low melting point such as the bismuth-lead alloy known as "Cerrobend." In addition to the fusible sealing plug, there is shown a grid member 25 assembled in the portion 21 of the passageway 17. As shown in Figure 2, the grid member comprises a plurality of spaced vertical members 26 connected with a plurality of spaced horizontal members 27 so as to form a supporting structure. The grid member is dimensioned so as to fit snugly within the confines of the portion 21 of the passageway 17, rearwardly of the inner surface of fusible sealing plug 24, and in tight contact therewith. Although there are many ways in which the two elements above may be assembled in the manner shown, I prefer to shrink-fit the parts into the connector by conventional methods.

Connected to another section of tubing 11 is connector member or fitting 28. The connector 28 includes a differential bore or passageway 29 extending therethrough. The passageway has a first portion 30 having a diameter substantially the same as the outside diameter as the section of tubing 11 to which it is to be attached. Extending axially from the portion 30 of the passageway 29 is a second portion 31 having a diameter substantially the same as the diameter of portion 21 of opening 17 in the connector 16. The connector 28 is assembled to the section of tubing 11 in a manner similar to that described above with respect to connector 16. The outer surface of the connector 28 has a conical portion 33, and a cylindrical portion 34, an enlarged flange portion 35, and a conical portion 36 adapted to bear against seat 23 when the connectors 16 and 28 are brought together prior to joining the two sections of tubing 11. The connector 28 is provided with a fusible plug member 37 similar to that assembled in connector 16. Likewise a grid member 38 similar to that described above is positioned behind the plug member in the manner shown in Figure 3. When it is desired to connect the two sections of tubing 11, the conical portion 35 of connector 28 is placed against the seat portion 23 of connector 16 so that the two fusible sealing plugs are substantially contiguous. To prevent axial separation of the connector 16 and the connector 28 a hollow collar 40 having an internally threaded portion 41 adapted to be connected to the externally threaded portion of the connector 16 is assembled about the outer surface 34 of connector 28. The collar 40 is provided with an axial opening 42. An inwardly extending flange 43 on one end of the collar 40 cooperates with the portion 35 of connector 28 to limit the movement of the collar afforded by the engagement of the threaded surfaces.

After the connectors 16 and 28 have been assembled in the manner described above and separation of the two elements has been prevented through the action of collar 40 heat, sufficient to melt the fusible plug members, is applied to the assembled connection. As the material forming the plug member melts, it flows along the spaced elements of the retaining member which have been tinned or coated with a material designed to provide a strong affinity for the action desired. Thus, it will be appreciated that the fusible plug element 24 has been melted and that passage of the refrigerant through the two sections of line 11 is possible. It will be observed that in disposing of the material forming the plug member a substantial pressure reduction has been avoided and further that the material forming the fusible plug member will not become entrained as refrigerant flows from one section of the tubing 11 to the other.

A preferred arrangement for providing the novel fusible sealing member in either of the connectors or fittings 16 or 28 is to apply a thin coating of the material forming the plug 24 over the vertical and horizontal members of the retaining means 25 making certain, however, to apply an amount on the outer edges of the members sufficient to bridge over the openings between the members. The thickness of the layer extending across the openings between the vertical and horizontal grid members may be varied.

It will be evident that sub-assemblies of the various refrigeration system components may be formed or fabricated in the factory for subsequent connection in the field. In each instance a connector or fitting of the type illustrated in Figure 3 will be secured to each end of a component of the sub-assembly.

The particular coupling device herein described may be used with other closed systems as for example, those mentioned above. Other material than that indicated above may be used to form the fusible sealing element, the choice being dictated by the thermal characteristics of the contents of the system. Other constructions and modifications will be obvious to those skilled in the art without departing from my invention, and I therefore intend in the appended claims to cover all constructions and modifications as fall within the true spirit and scope of my invention.

I claim:

1. In combination, a first body including a normally open end portion; means forming a closure for said end portion, said means including a fusible sealing element and a retaining member having a plurality of openings therethrough; a second body, means for connecting said first body to said second body so that upon application of a predetermined amount of heat the fusible sealing element will melt and the liquid material formed will be distributed over the retaining member to provide communication between said first and second bodies.

2. A coupling element for conjoining two sealed systems to form a unitary sealed system, said element comprising: a connector adapted to the extended between said systems and including means defining a passageway therethrough; a fusible plug in said passageway blocking flow therethrough; means retaining the molten material of said plug in the event of fusing thereof to prevent the molten material from mixing with any fluids flowing through said passageway, said last mentioned means comprising a grid which is coated by said molten material but permits the free flow of the fluids in said system.

3. A coupling element for conjoining two sealed systems to form a unitary sealed system, said element comprising: two mating conduit connectors, adapted to be conjoined; a plug of a low melting point alloy material in at least one of said conduit connectors; and grid means adjacent said plug adapted to retain the molten alloy of said plug upon melting thereof, whereby said conduit elements upon being conjoined will form a continuous passageway and the alloy of said plug will be retained by said grid means without interrupting flow therethrough rather than being entrained in any fluid passing through said conduit connectors.

4. A coupling element as in claim 3, in which the surface of said grid is coated with the alloy to insure a bond between the molten alloy and the grid.

5. In a coupling, a first element defining a passageway, a second element defining a passageway, means for joining the first and second elements, a fusible plug member located in one of said passageways and a retaining member located adjacent said plug and having a plurality of passageways and exposing substantial surface areas whereby when heat is applied to said fusible plug, the molten metal resulting therefrom will become attached to said retaining member without obstructing flow through the passageways.

6. A coupling, according to claim 5 in which the retaining member comprises a plurality of spaced first members extending substantially normal to the longitudinal axis of the passageway in the first and second elements, a plurality of spaced second members extending in a direction substantially normal to the first members, said first and second members being secured together to define a grid having a plurality of square openings.

References Cited in the file of this patent
UNITED STATES PATENTS

| | | |
|---|---|---|
| 243,847 | Buritt | July 5, 1881 |
| 1,093,576 | McNutt | Apr. 14, 1914 |
| 2,507,379 | Morrison | May 9, 1950 |
| 2,667,760 | Curtis | Feb. 2, 1954 |
| 2,702,993 | Harris | Mar. 1, 1955 |
| 2,782,496 | Augustauskas | Feb. 26, 1957 |